UNITED STATES PATENT OFFICE.

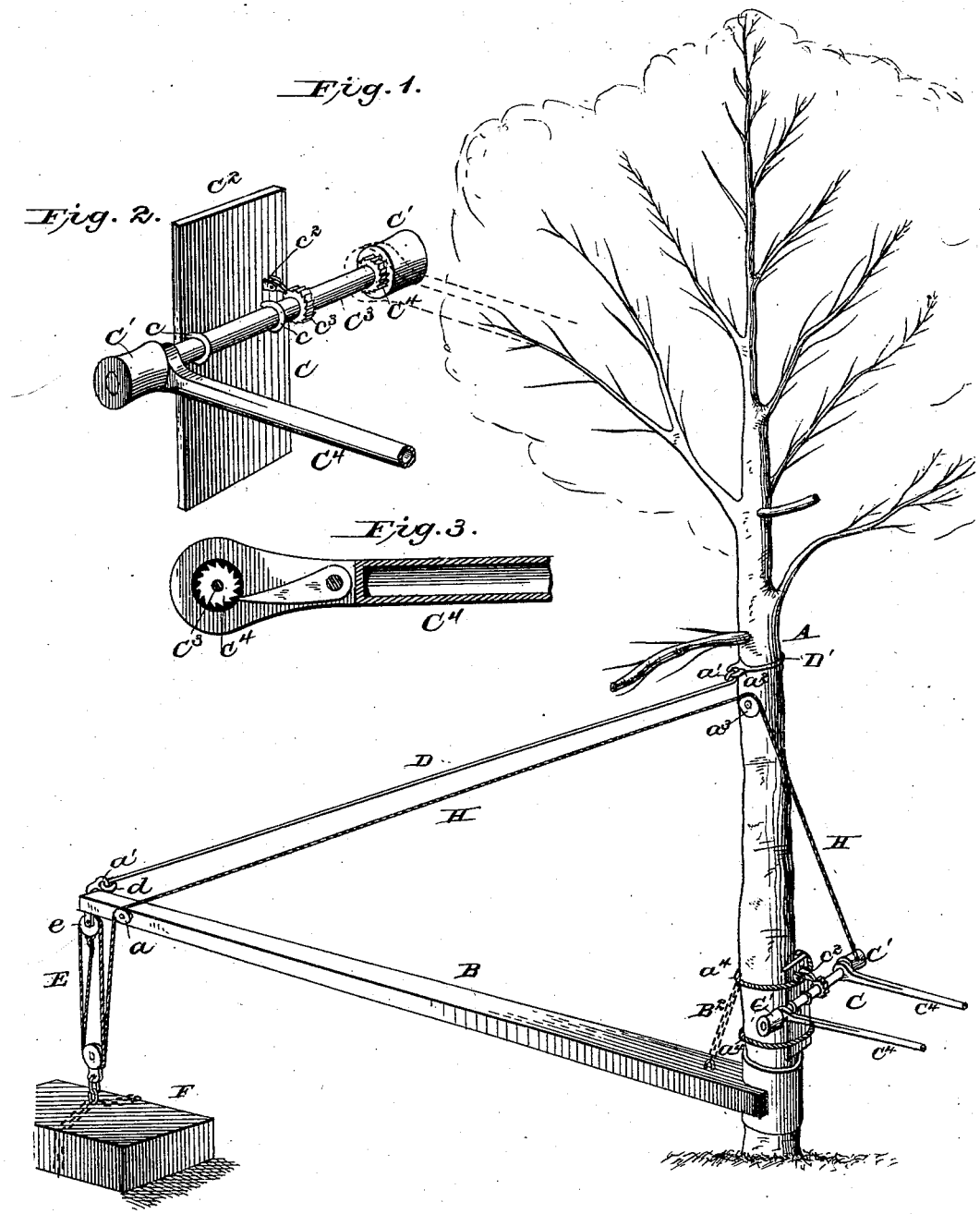

WILLIAM H. GLENNON, OF QUINCY, MASSACHUSETTS.

CRANE OR DERRICK.

SPECIFICATION forming part of Letters Patent No. 272,236, dated February 13, 1883.

Application filed December 11, 1882. (No model.)

*To all whom it may concern:*

Be it known that I, WILLIAM HENRY GLENNON, a citizen of the United States, residing at Quincy, in the county of Norfolk and State of Massachusetts, have invented certain new and useful Improvements in Cranes or Derricks; and I do hereby declare the following to be a full, clear, and exact description of the invention, such as will enable others skilled in the art to which it appertains to make and use the same.

My invention relates to portable cranes or derricks.

The object of my invention is to provide a crane which is adapted to be attached to a mast, tree, or other object, thus rendering the carriage of a complete derrick unnecessary. It is more particularly designed for use by stone-cutters and monument-setters, as they often find it inconvenient to transport large derricks to the cemeteries, or, where convenience of carriage is practicable, the use of the derrick is impracticable, because of the trees and other objects which interfere with the proper movements of the crane.

The novel features will hereinafter be described in the specification and pointed out in the claims, reference being had to the accompanying drawings, in which—

Figure 1 is a perspective view of my crane attached to a tree; Fig. 2, a perspective view of the windlass; and Fig. 3, a sectional view of the windlass, taken longitudinally through one of the ratchet-wheels, pawl, and lever.

A represents the tree; B, the boom; C, the windlass; D, the top lift; E, the tackle; F, the weight, and H the lifting-rope.

The tree A is designed to take the place of the mast, and one should be selected near the place where the crane is to be used, of sufficient diameter and strength to support the load upon the outer end of the crane.

The boom B is formed of wood of sufficient strength for the purpose, and provided with a crotch on its inner end which partly encircles the tree, which may be provided with any suitable covering to protect it from injury when the boom is revolved. The inner end of the boom may be supported by a chain, $B^2$, which encircles the tree some distance above the point where the crotch rests. The outer end of the boom is provided with a block or sheave, $a$, over or through which the lifting-rope passes. The upper side is provided with an eye, $a'$, in which the boom-top lift is loosely attached.

The boom-top lift D is preferably an iron rod of any suitable diameter and having hooks $d\ d'$ upon each end. The hook $d$ on the outer end, as before stated, is attached to the eye $a'$ upon the upper side of the front end of the boom. The inner end, $d'$, is loosely attached to an eye, $d^2$, on the girdle $D'$. The object in thus attaching the boom-top lift is to permit of its having any motion that may be imparted to the boom, so that when the latter is swinging upon the tree the boom-top lift will follow without turning the girdle $D'$, which, if moved, would probably injure the tree. To the under side of the boom is attached a block, $e$, from which the lifting-tackle E is suspended.

The lifting-rope H passes over or through block or sheave $a$ to a second block or sheave, $a^3$, removably attached to the tree in any suitable manner. The rope is then attached to or passed over one of the spools $C'\ C'$ on windlass C.

The shaft $C^3$ of the windlass is journaled in bearings $c\ c$, attached to a hard-wood plank, $C^2$, which is attached to the tree by ropes or chains $a^4\ a^4$. If desired, the chain $B^2$ may be suspended from one of these chains. The board may be nailed to the tree; but I prefer the way shown, as it will not injure the latter.

Upon the board $C^2$ is a pawl, $c^2$, which catches in the teeth of ratchet-wheel $c^3$ on the shaft of the windlass.

Upon the inner side of the spools are formed ratchet-wheels $c^4$, over which the lever and catch $C^4$ move. The lever is provided with a recess, in which a spike may be inserted when it is desired to increase the leverage.

In practice I prefer to have all the parts removable, so that the crane can be taken apart and transported in that manner.

It is obvious that the blocks or sheaves $a\ a^3$ may be provided with hooks to facilitate their attachment, and can be attached respectively on opposite sides of the boom and tree. The windlass is provided with a spool at each end, which project outside the tree, so that the lift-rope will have a drum no matter upon which side of the tree the rope may be.

It is obvious that the parts can be increased in size or number without departing from my invention, and that any ordinary weight can be lifted by the apparatus. The particular novelty of my invention, however, lies in the ease with which the device can be taken apart, put together, transported, and its availability in cases where it would be inconvenient or impossible to move or place a derrick of the kind ordinarily used.

What I claim as new is—

1. In a crane, the combination of a boom having a crotch at one end and blocks or sheaves and an eye at the other, a girdle having an eye, a boom-top lift loosely attached by each end to the eyes on the boom and the girdle, tackle attached to the outer end of the boom, a windlass, and a lift-rope attached to the tackle and the windlass, for the purpose set forth.

2. The combination, with a mast, tree, or other upright, of a boom having a crotch at one end and blocks or sheaves and an eye at the other, a girdle encircling the mast or tree and having an eye, a boom-top lift attached by its ends to the eyes on the boom and girdle, a windlass attached to the mast or tree and having a chain to support the inner end of the boom, and a lift-rope attached to the tackle and windlass, for the purpose set forth.

In testimony whereof I affix my signature in presence of two witnesses.

W. H. GLENNON.

Witnesses:
  M. F. HALLECK,
  C. A. NEALE.